(12) United States Patent
Korp

(10) Patent No.: US 8,182,340 B2
(45) Date of Patent: May 22, 2012

(54) METHOD AND SYSTEM FOR USING TEMPORARY INFORMATION ON PERSONAL DEVICES

(75) Inventor: Peter A. Korp, Naperville, IL (US)

(73) Assignee: Digital Monks, LLC, Naperville, IL (US)

( * ) Notice: Subject to any disclaimer, the term of this patent is extended or adjusted under 35 U.S.C. 154(b) by 1004 days.

(21) Appl. No.: 12/009,358

(22) Filed: Jan. 18, 2008

(65) Prior Publication Data

US 2008/0182661 A1    Jul. 31, 2008

Related U.S. Application Data

(60) Provisional application No. 60/898,797, filed on Jan. 31, 2007.

(51) Int. Cl.
*A63F 9/24* (2006.01)
(52) U.S. Cl. ............... 463/31; 463/29; 463/36; 463/40; 705/51; 705/59; 705/64
(58) Field of Classification Search ............... 463/29, 463/31, 36, 40; 705/51, 59, 64
See application file for complete search history.

(56) References Cited

U.S. PATENT DOCUMENTS

| | | | | |
|---|---|---|---|---|
| 6,554,707 | B1 * | 4/2003 | Sinclair et al. | 463/39 |
| 7,315,829 | B1 * | 1/2008 | Tagawa et al. | 705/26.1 |
| 7,424,973 | B2 * | 9/2008 | Knox | 235/382 |
| 7,425,175 | B2 * | 9/2008 | Nakano et al. | 463/11 |
| 2003/0054878 | A1 * | 3/2003 | Benoy et al. | 463/29 |
| 2003/0157976 | A1 * | 8/2003 | Simon et al. | 463/1 |
| 2003/0171147 | A1 * | 9/2003 | Sinclair et al. | 463/39 |
| 2005/0227757 | A1 * | 10/2005 | Simon | 463/25 |
| 2006/0142085 | A1 * | 6/2006 | Kim | 463/42 |
| 2006/0258415 | A1 * | 11/2006 | Nakano et al. | 463/1 |
| 2006/0261942 | A1 * | 11/2006 | Frank | 340/539.26 |

* cited by examiner

*Primary Examiner* — Pierre Eddy Elisca
*Assistant Examiner* — Shahid Kamal
(74) *Attorney, Agent, or Firm* — Lesavich High-Tech Group, P.C.; Stephen Lesavich

(57) ABSTRACT

A method and system for using temporary information on personal devices such as a personal game playing device. The methods and system described herein may help further utilize large base of personal game playing devices by allowing them to receive temporary information associated with sub-events and/or temporal sub-events for a desired event including live and non-live events via wireless and wired connections at the event venue.

20 Claims, 5 Drawing Sheets

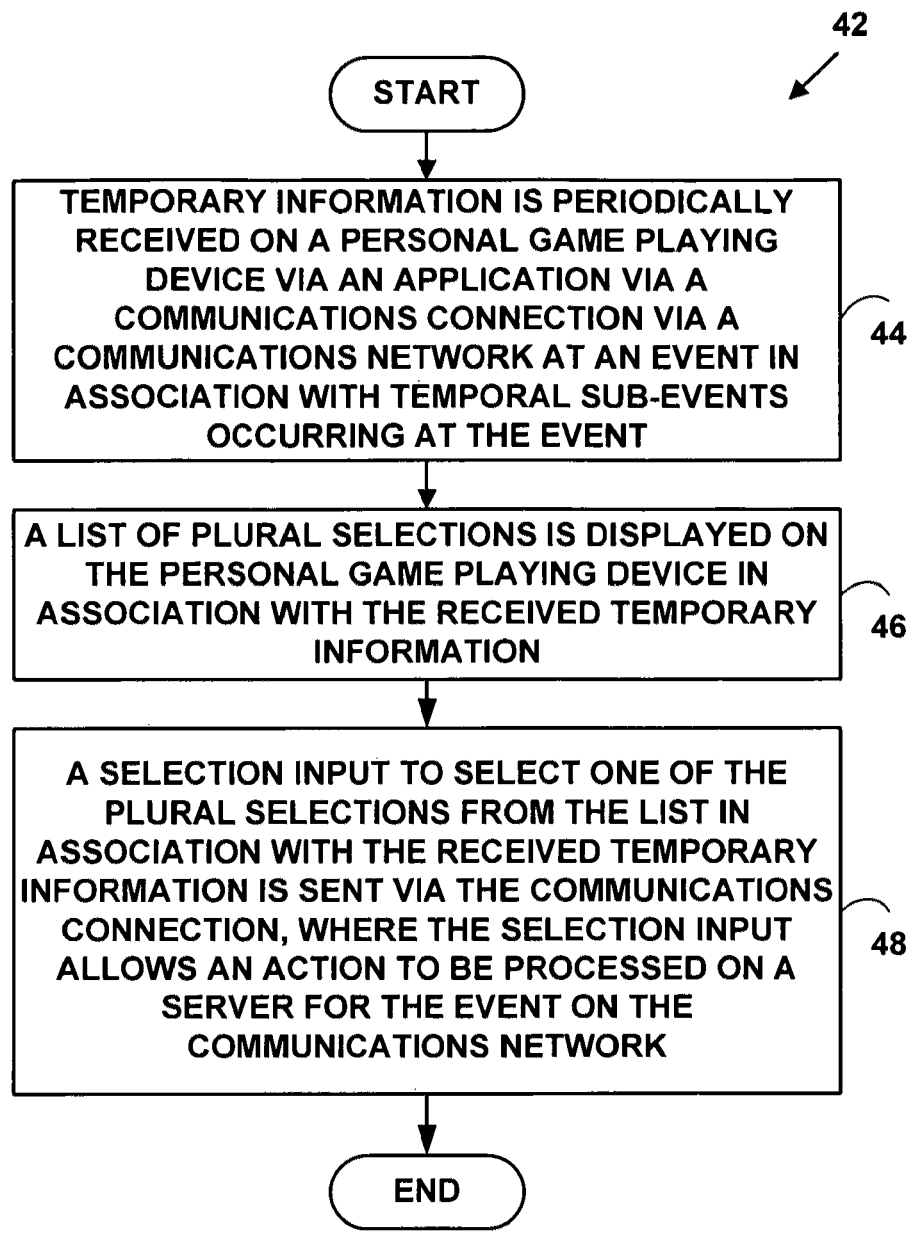

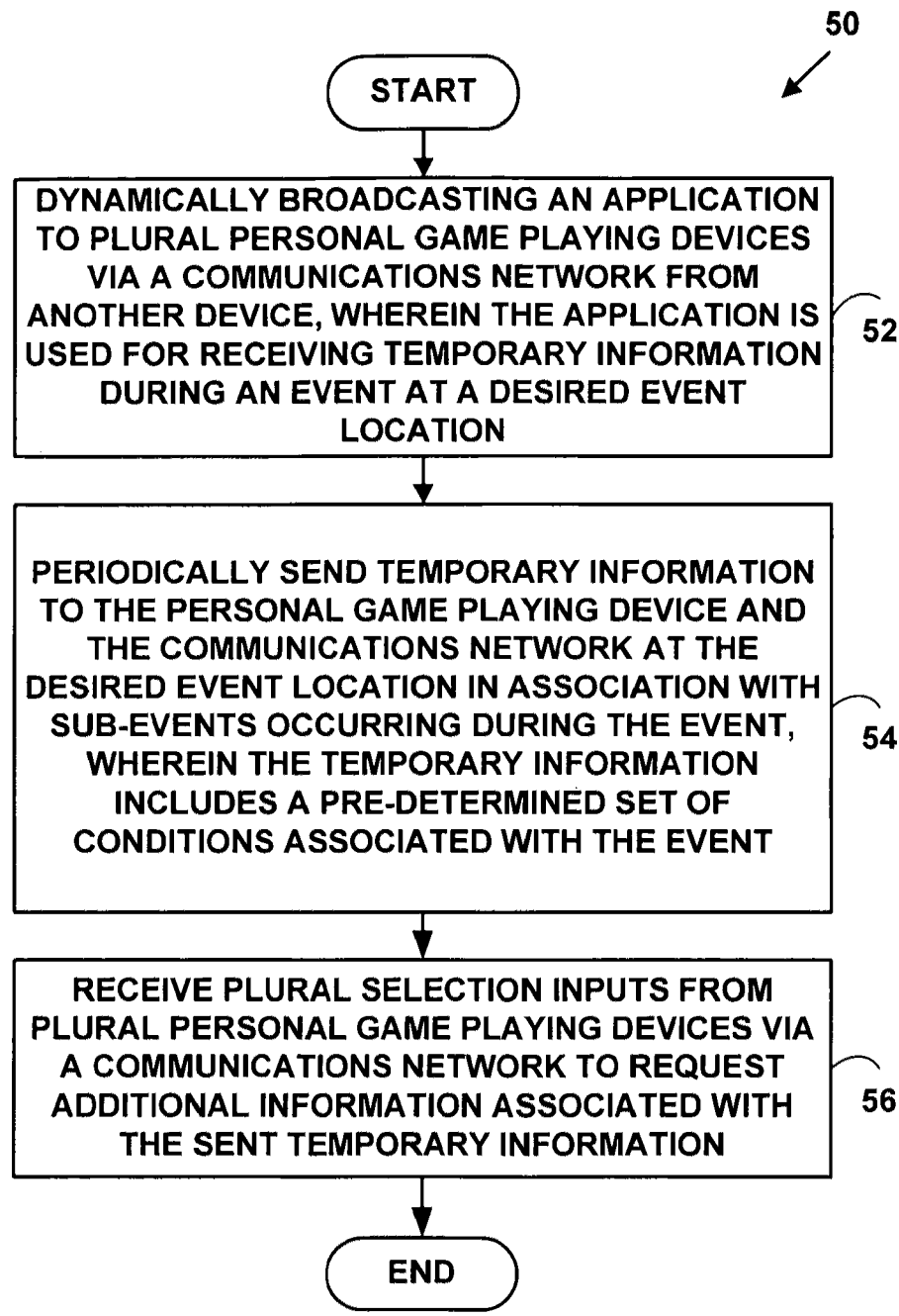

METHOD AND SYSTEM FOR USING TEMPORARY INFORMATION ON PERSONAL DEVICES

CROSS REFERENCES TO RELATED APPLICATIONS

This application claims priority to U.S. Provisional Application 60/898,797, filed Jan. 31, 2007, the contents of which are incorporated by reference.

FIELD OF THE INVENTION

The invention relates to personal devices. More specifically, it relates to a method and system for using temporary information on personal devices.

BACKGROUND OF THE INVENTION

There are a large number of people, both adults and children who own personal devices including personal game playing devices, such as the Play Station Portable (PSP) by Sony, the Gameboy and DS by Nintendo, and others. These devices are typically used by buying different game cartridges for different games, etc. The personal game playing devices are frequently carried around by both children and adults to play games. Thus, there is a large untapped pool of devices for which temporary electronic information can be sent to.

It is becoming more common to send advertising and other types of electronic information to personal electronic devices such as mobile phones, personal digital data assistants (PDAs) etc. However, such electronic information is not typically being sent or utilized by personal game playing devices. In many instances, these personal game playing devices have the capability either via a wired or wireless connection to receive and store temporary information. For example, plural game players can play an interactive game via communications network in which game information is temporarily stored on the personal game playing devices. Such temporary information is lost when the power for the personal game playing device is turned off.

Thus, it is desirable to further utilize personal devices by allowing them to receive and use temporary information at events such as live event or non-live events that include one or more sub-events.

SUMMARY OF THE INVENTION

In accordance with preferred embodiments of the present invention, some of the problems associated with utilizing personal devices are overcome. A method and system for using temporary information on a personal device is presented.

The methods and systems described herein may help further utilize large base of personal devices, such as personal game playing devices, by allowing them to receive temporary information associated with temporal sub-events and/or non-temporal sub-events for a desired event at the event venue.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIG. 4 is a flow diagram illustrating a method for interacting with temporary information received on a personal device;

FIG. 5 is a flow diagram illustrating a method for processing temporary information for personal game playing device.

DETAILED DESCRIPTION OF PREFERRED EMBODIMENTS

Temporary Information Processing System

Figure 1:
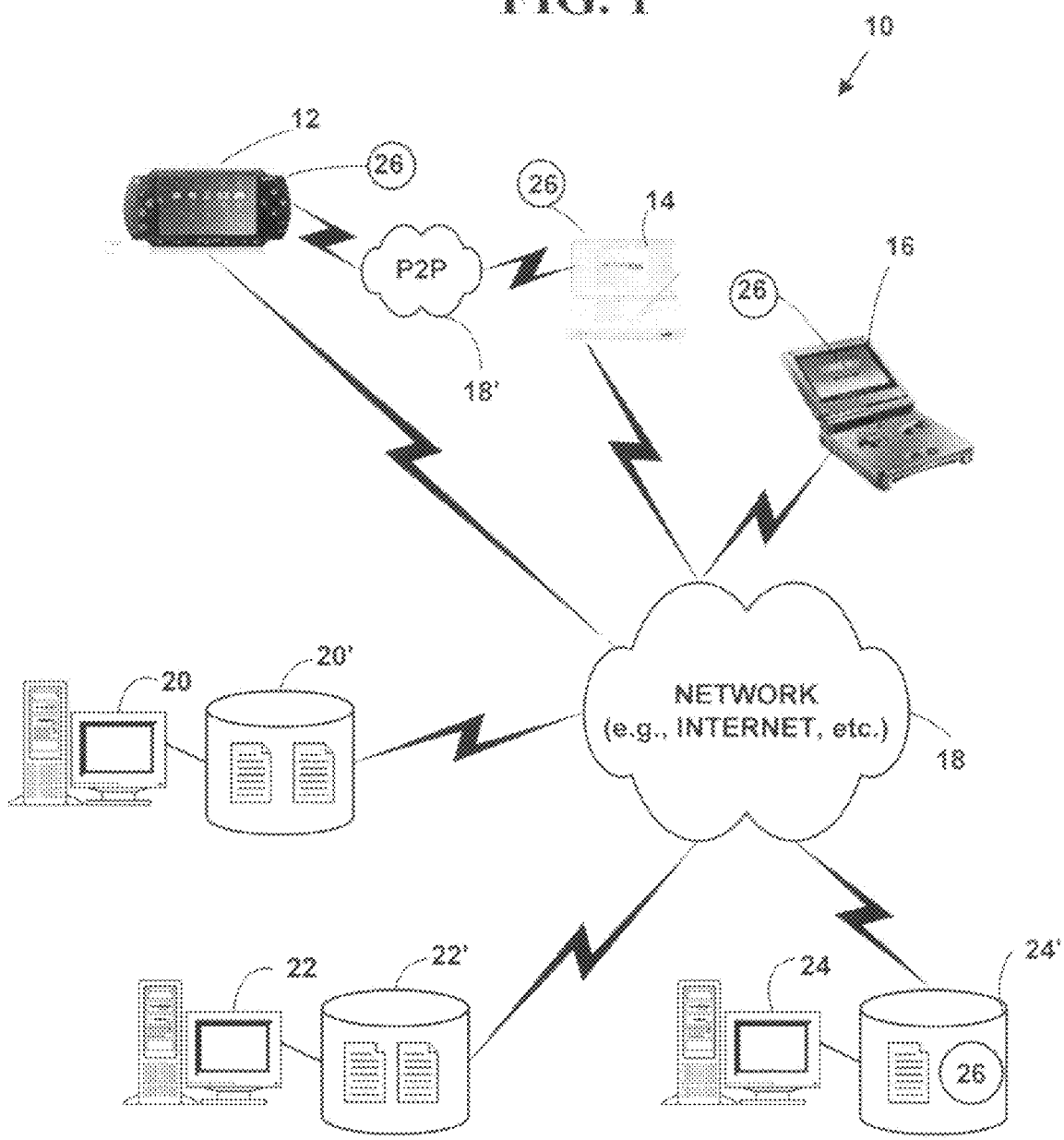
FIG. 1 is a block diagram illustrating an exemplary portable information system for electronic devices.

FIG. 1 is a block diagram illustrating an exemplary temporary electronic information system for electronic devices. The exemplary system 10 includes, but is not limited to, one or more target devices 12, 14, 16 (only three of which are illustrated). However, the present invention is not limited to these target electronic devices and more, fewer or others types of target electronic devices can also be used. The target devices 12, 14, 16 are in communications with a communications network 18. The communications includes, but is not limited to, communications over a wire connected to the target network devices, wireless communications, and other types of communications using one or more communications and/or networking protocols.

Plural server devices 20, 22, 24 (only three of which are illustrated) include one or more associated databases 20', 22', 24'. The plural network devices 20, 22, 24 are in communications with the one or more target devices 12, 14, 16 via the communications network 18. The plural server devices 20, 22, 24, include, but are not limited to, World Wide Web servers, Internet servers, file servers, other types of electronic information servers, and other types of server network devices (e.g., edge servers, firewalls, routers, gateways, etc.).

The plural server devices 20, 22, 24 include, but are not limited to, servers used for storing electronic information for users of target devices 12, 14, 16. The one or more associated databases 20, 22, 24 include electronic information in plural digital formats, including, but not limited to, Hyper Text Markup Language (HTML), Extensible Markup Language (XML), Wireless Access Protocol (WAP), flash media, Java and various combinations thereof.

The one or more target devices 12, 14, 16 and the plural server devices 20, 22, 24 include an information application 26. The information application 26 may be a stand-alone application 26 that receives information via the communications network 18 or networking applications 26' that includes two-way communications with other networking applications 26' via the communications network 18.

In applications 26, 26' include, software, hardware (e.g., ROM, Flash, etc.) firmware or other types of applications such as DVD's, audio files, etc.

The target devices 12, 14, 16 include a protocol stack with multiple layers based on the Internet Protocol or OSI reference model.

As is known in the art, the Open Systems Interconnection ("OSI") reference model is a layered architecture that standardizes levels of service and types of interaction for network devices exchanging information through a communications network. The OSI reference model separates network device-to-network device communications into seven protocol layers, or levels, each building- and relying—upon the standards contained in the levels below it. The OSI reference model includes from lowest-to-highest, a physical, data-link, network, transport, session, presentation and application layer. The lowest of the seven layers deals solely with hardware links; the highest deals with software interactions at the application-program level.

As is known in the art, the Internet Protocol reference model is a layered architecture that standardizes levels of service for the Internet Protocol suite of protocols. The Internet Protocol reference model comprises in general from lowest-to-highest, a link, network, transport and application layer.

The one or more target devices 12, 14, 16 include, but are not limited to, personal game playing devices such as the Play Station Portable (PSP) by Sony, the Gameboy and DS by Nintendo, and others, digital/data assistants (PDAs), (e.g., Palm Pilot by Palm, etc.) personal audio/video devices, (e.g., iPod by Apple, Zune by Microsoft, other MP3/video players, etc.) the iPhone by Apple, etc., other similar mobile phones by Verizon, such as the Voyager, and others.

The one or more target devices 12, 14, 16 may also include personal laptop computers, mobile computers, desktop computers, Internet appliances, mobile phones, or other similar personal mobile electronic devices. Other or equivalent devices can also be used to practice the invention. The target devices 12, 14, 16, may also be replaced with other types of devices including, but not limited to, the Nintendo Wii, client terminals in communications with one or more servers, other types of electronic devices.

The communications network 18 includes, but is not limited to, a wired or wireless, Internet, an intranet, a Local Area Network (LAN), a LAN (WiLAN), a Wide Area Network (WAN), a Metropolitan Area Network (MAN), a cable television network (CATV), a satellite television network (SATV), a Public Switched Telephone Network (PSTN), Peer-to-Peer (P2P) and other types of communications networks 18.

In one embodiment, the communications network 18 and target devices 12, 14, 16 and the communications network 18 and the server devices 20, 22, 24 comprise a peer-to-peer (P2P) network. A P2P network uses diverse connectivity between participants in a network and the cumulative bandwidth of network participants rather than centralized resources. Peer-to-peer networks are typically used for connecting communication nodes via ad hoc connections. A pure peer-to-peer network does not have the notion of client devices or server devices, but only equal "peer" nodes that simultaneously function as both "clients" and "servers" to the other nodes on the network. This model of network arrangement differs from the client-server model where communication is usually to and from client devices and a central server.

The communications network 18 may include one or more gateways, routers, bridges, switches or access points. As is known in the art, a gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another. A switch is a device that processes and forwards digital information (e.g., data information, voice information, etc.) between network segments. The access points include wireless access points (WiAPs), etc.

The communications network 18 may include one or more servers and one or more web-sites accessible by users to send and receive information usable by the one or more computers 12. The one or more servers may also include one or more associated databases for storing electronic information.

Preferred embodiments of the present invention include network devices that are compliant with all or part of standards proposed by the Institute of Electrical and Electronic Engineers ("IEEE"), International Telecommunications Union-Telecommunication Standardization Sector ("ITU"), European Telecommunications Standards Institute (ETSI), Internet Engineering Task Force ("IETF"), U.S. National Institute of Security Technology ("NIST"), American National Standard Institute ("ANSI"), Wireless Application Protocol ("WAP") Forum, Data Over Cable Service Interface Specification (DOCSIS), Bluetooth Forum, or the ADSL Forum. However, network devices based on other standards could also be used. IEEE standards can be found on the World Wide Web at the Universal Resource Locator ("URL") "www.ieee.org." The ITU, (formerly known as the CCITT) standards can be found at the URL "www.itu.ch." ETSI standards can be found at the URL "www.etsi.org." IETF standards can be found at the URL "www.ietf.org." The NIST standards can be found at the URL "www.nist.gov." The ANSI standards can be found at the URL "www.ansi.org." DOCSIS documents can be found at the URL "www.cablemodem.com." Bluetooth Forum documents can be found at the URL "www.bluetooth.com." WAP Forum documents can be found at the URL "www.wapforum.org." ADSL Forum documents can be found at the URL "www.adsl.com."

The communications network 18 includes, but is not limited to, data networks using the Transmission Control Protocol (TCP), User Datagram Protocol (UDP), Internet Protocol (IP) and other data protocols.

As is know in the art, TCP provides a connection-oriented, end-to-end reliable protocol designed to fit into a layered hierarchy of protocols which support multi-network applications. TCP provides for reliable inter-process communication between pairs of processes in network devices attached to distinct but interconnected networks. For more information on TCP see Internet Engineering Task Force (ITEF) Request For Comments (RFC)-793, the contents of which are incorporated herein by reference.

As is known in the art, UDP provides a connectionless mode of communications with datagrams in an interconnected set of computer networks. UDP provides a transaction oriented datagram protocol, where delivery and duplicate packet protection are not guaranteed. For more information on UDP see IETF RFC-768, the contents of which incorporated herein by reference.

As is known in the art, IP is an addressing protocol designed to route traffic within a network or between networks. IP is described in IETF Request For Comments (RFC)-791, the contents of which are incorporated herein by reference. However, more fewer or other protocols can also be used on the communications network 18 and the present invention is not limited to TCP/UDP/IP.

In one embodiment, the communications network 18 includes wired interfaces connecting portions of a PSTN or cable television network that connect the target devices 12, 14, 16 via one or more twisted pairs of copper wires including the varieties of digital subscriber line (DSL), coaxial cable, fiber optic cable, other connection media or other connection interfaces. The PSTN is any public switched telephone network provided by AT&T, GTE, Sprint, MCI, SBC, Verizon and others.

In another embodiment, the communications network 18 includes one or more different types of wireless interfaces that connect the target devices 12, 14, 16 wirelessly to communications network 18. The wireless interfaces include but are not limited to, an IEEE 802.11a, 802.11b, 802.11g, 802.11n, "Wireless Fidelity" ("Wi-Fi"), "Worldwide Interoperability for Microwave Access" ("WiMAX"), ETSI High Performance Radio Metropolitan Area Network (HIPERMAN). In another embodiment of, the wireless interfaces Bluetooth (IEEE 802.15.1a) infra data association (IrDA) module or Industrial, Scientific and Medical (ISM) 400 MHz, 800 MHz, and 900 Mhz wireless interfaces. However, the present invention is not limited to such an embodiment and other types wireless interfaces can also be used.

As is known in the art, an 802.11b is a short-range wireless network. The IEEE 802.11b standard defines wireless interfaces that provide up to 11 Mbps wireless data transmission to and from wireless devices over short ranges. 802.11a is an extension of the 802.11b and can dedesiredr speeds up to 54M bps. 802.11g dedesiredr speeds on par with 802.11a. However, other 802.11XX interfaces can also be used and the present invention is not limited to the 802.11 protocols defined. The IEEE 802.11a, 802.11b and 802.11g standards are incorporated herein by reference.

As is known in the art, Wi-Fi is a type of 802.11xx interface, whether 802.11b, 802.11a, dual-band, etc. Wi-Fi devices include an RF interfaces such as 2.4 GHz for 802.11b or 802.11g and 5 GHz for 802.11a. More information on Wi-Fi can be found at the URL www.weca.net.

As is known in the art, WiMAX is an industry trade organization formed by leading communications component and equipment companies to promote and certify compatibility and interoperability of broadband wireless access equipment that conforms to the IEEE 802.16XX and ETSI HIPERMAN. HIPERMAN is the European standard for metropolitan area networks (MAN).

The IEEE The 802.16a and 802.16g standards are wireless MAN technology standard that provides a wireless alternative to cable, DSL and T1/E1 for last mile broadband access. It is also used as complimentary technology to connect IEEE 802.11XX hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16e and 802.16g standards are incorporated herein by reference. More information on WiMAX can be found at the URL "www.wimaxforum.org." WiMAX can be used to provide a WLP.

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. More information on ETSI standards can be found at the URL "www.etsi.org." ETSI HIPERMAN can be used to provide a WLP.

An operating environment for the devices of the exemplary system 10 include a processing system with one or more high speed Central Processing Unit(s) ("CPU"), processors and one or more memories. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU-executed," or "processor-executed."

It will be appreciated that acts and symbolically represented operations or instructions include the manipulation of electrical signals by the CPU or processor. An electrical system represents data bits which cause a resulting transformation or reduction of the electrical signals or biological signals, and the maintenance of data bits at memory locations in a memory system to thereby reconfigure or otherwise alter the CPU's or processor's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM"), flash memory, etc.) mass storage system readable by the CPU. The computer readable medium includes cooperating or interconnected computer readable medium, which exist exclusively on the processing system or can be distributed among multiple interconnected processing systems that may be local or remote to the processing system.

Security and Encryption

Devices and interfaces of the present invention include security and encryption for secure communications and secure recording of information. Wireless Encryption Protocol (WEP) (also called "Wired Equivalent Privacy) is a security protocol for WiLANs defined in the IEEE 802.11b standard. WEP is cryptographic privacy algorithm, based on the Rivest Cipher 4 (RC4) encryption engine, used to provide confidentiality for 802.11b wireless data.

As is known in the art, RC4 is cipher designed by RSA Data Security, Inc. of Bedford, Mass., which can accept encryption keys of arbitrary length, and is essentially a pseudo random number generator with an output of the generator being XORed with a data stream to produce encrypted data.

One problem with WEP is that it is used at the two lowest layers of the OSI model, the physical layer and the data link layer, therefore, it does not offer end-to-end security. One another problem with WEP is that its encryption keys are static rather than dynamic. To update WEP encryption keys, an individual has to manually update a WEP key. WEP also typically uses 40-bit static keys for encryption and thus provides "weak encryption," making a WEP device a target of hackers.

The IEEE 802.11 Working Group is working on a security upgrade for the 802.11 standard called "802.11i." This supplemental draft standard is intended to improve WiLAN security. It describes the encrypted transmission of data between systems 802.11X WiLANs. It also defines new encryption key protocols including the Temporal Key Integrity Protocol (TKIP). The IEEE 802.11i draft standard, version 4, completed Jun. 6, 2003, is incorporated herein by reference.

The 802.11i is based on 802.1x port-based authentication for user and device authentication. The 802.11i standard includes two main developments: Wireless or Wi-Fi Protected Access (WPA) and Robust Security Network (RSN).

WPA uses the same RC4 underlying encryption algorithm as WEP. However, WPA uses TKIP to improve security of keys used with WEP. WPA keys are derived and rotated more often than WEP keys and thus provide additional security. WPA also adds a message-integrity-check function to prevent packet forgeries.

RSN uses dynamic negotiation of authentication and selectable encryption algorithms between wireless access points and wireless devices. The authentication schemes proposed in the draft standard include Extensible Authentication Protocol (EAP). One proposed encryption algorithm is an Advanced Encryption Standard (AES) encryption algorithm.

Dynamic negotiation of authentication and encryption algorithms lets RSN evolve with the state of the art in security, adding algorithms to address new threats and continuing to provide the security necessary to protect information that WiLANs carry.

The NIST developed a new encryption standard, the Advanced Encryption Standard (AES) to keep government information secure. AES is intended to be a stronger, more efficient successor to Triple Data Encryption Standard (3DES). More information on NIST AES can be found at the URL "www.nist.gov/aes."

As is known in the art, DES is a popular symmetric-key encryption method developed in 1975 and standardized by ANSI in 1981 as ANSI X.3.92, the contents of which are incorporated herein by reference. As is known in the art, 3DES is the encrypt-decrypt-encrypt (EDE) mode of the DES cipher algorithm. 3DES is defined in the ANSI standard, ANSI X9.52-1998, the contents of which are incorporated herein by reference. DES modes of operation are used in conjunction with the NIST Federal Information Processing Standard (FIPS) for data encryption (FIPS 46-3, October 1999), the contents of which are incorporated herein by reference.

The NIST approved a FIPS for the AES, FIPS-197. This standard specified "Rijndael" encryption as a FIPS-approved symmetric encryption algorithm that may be used by U.S. Government organizations (and others) to protect sensitive information. The NIST FIPS-197 standard (AES FIPS PUB 197, November 2001) is incorporated herein by reference.

The NIST approved a FIPS for U.S. Federal Government requirements for information technology products for sensitive but unclassified (SBU) communications. The NIST FIPS Security Requirements for Cryptographic Modules (FIPS PUB 140-2, May 2001) is incorporated herein by reference.

As is known in the art, RSA is a public key encryption system which can be used both for encrypting messages and making digital signatures. The letters RSA stand for the names of the inventors: Rivest, Shamir and Adleman. For more information on RSA, see U.S. Pat. No. 4,405,829, now expired, incorporated herein by reference.

As is known in the art, "hashing" is the transformation of a string of characters into a usually shorter fixed-length value or key that represents the original string. Hashing is used to index and retrieve items in a database because it is faster to find the item using the shorter hashed key than to find it using the original value. It is also used in many encryption algorithms.

Secure Hash Algorithm (SHA), is used for computing a secure condensed representation of a data message or a data file. When a message of any length $<2^{64}$ bits is input, the SHA-1 produces a 160-bit output called a "message digest." The message digest can then be input to other security techniques such as encryption, a Digital Signature Algorithm (DSA) and others which generates or verifies a security mechanism for the message. SHA-512 outputs a 512-bit message digest. The Secure Hash Standard, FIPS PUB 180-1, Apr. 17, 1995, is incorporated herein by reference.

Message Digest-5 (MD-5) takes as input a message of arbitrary length and produces as output a 128-bit "message digest" of the input. The MD5 algorithm is intended for digital signature applications, where a large file must be "compressed" in a secure manner before being encrypted with a private (secret) key under a public-key cryptosystem such as RSA. The IETF RFC-1321, entitled "The MD5 Message-Digest Algorithm" is incorporated here by reference.

As is known in the art, providing a way to check the integrity of information transmitted over or stored in an unreliable medium such as a wireless network is a prime necessity in the world of open computing and communications. Mechanisms that provide such integrity check based on a secret key are called "message authentication codes" (MACS). Typically, message authentication codes are used between two parties that share a secret key in order to validate information transmitted between these parties.

Keyed Hashing for Message Authentication Codes (HMAC), is a mechanism for message authentication using cryptographic hash functions. HMAC is used with any iterative cryptographic hash function, e.g., MD5, SHA-1, SHA-512, etc. in combination with a secret shared key. The cryptographic strength of HMAC depends on the properties of the underlying hash function. The IETF RFC-2101, entitled "HMAC: Keyed-Hashing for Message Authentication" is incorporated here by reference.

As is known in the art, an Electronic Code Book (ECB) is a mode of operation for a "block cipher," with the characteristic that each possible block of plaintext has a defined corresponding cipher text value and vice versa. In other words, the same plaintext value will always result in the same cipher text value. Electronic Code Book is used when a volume of plaintext is separated into several blocks of data, each of which is then encrypted independently of other blocks. The Electronic Code Book has the ability to support a separate encryption key for each block type.

As is known in the art, Diffie and Hellman (DH) describe several different group methods for two parties to agree upon a shared secret in such a way that the secret will be unavailable to eavesdroppers. This secret is then converted into various types of cryptographic keys. A large number of the variants of the DH method exist including ANSI X9.42. The IETF RFC-2631, entitled "Diffie-Hellman Key Agreement Method" is incorporated here by reference.

However, the present invention is not limited to the security or encryption techniques described and other security or encryption techniques can also be used.

As is known in the art, the HyperText Transport Protocol (HTTP) Secure (HTTPs), is a standard for encrypted communications on the World Wide Web. HTTPs is actually just HTTP over a Secure Sockets Layer (SSL). For more information on HTTP, see IETF RFC-2616 incorporated herein by reference.

As is known in the art, the SSL protocol is a protocol layer which may be placed between a reliable connection-oriented network layer protocol (e.g. TCP/IP) and the application protocol layer (e.g. HTTP). SSL provides for secure communication between a source and destination by allowing mutual authentication, the use of digital signatures for integrity, and encryption for privacy.

The SSL protocol is designed to support a range of choices for specific security methods used for cryptography, message digests, and digital signatures. The security method are negotiated between the source and destination at the start of establishing a protocol session. The SSL 2.0 protocol specification, by Kipp E. B. Hickman, 1995 is incorporated herein by reference. More information on SSL is available at the URL See "netscape.com/eng/security/SSL_2.html."

As is known in the art, Transport Layer Security (TLS) provides communications privacy over the Internet. The protocol allows client/server applications to communicate over a transport layer (e.g., TCP) in a way that is designed to prevent eavesdropping, tampering, or message forgery. For more information on TLS see IETF RFC-2246, incorporated herein by reference.

In one embodiment, the security functionality includes Cisco Compatible EXtensions (CCX). CCX includes security specifications for makers of 802.11xx wireless LAN chips for ensuring compliance with Cisco's proprietary wireless security LAN protocols. As is known in the art, Cisco Systems, Inc. of San Jose, Calif. is supplier of networking hardware and software, including router and security products.

Digital Rights Management (DRM)

Encryption does not prevent a user or device from copying electronic information. Instead encryption prevents unauthorized access to the actual electronic information by making the content of the electronic information unreadable. After electronic information is decrypted, it can be freely copied and distributed. In one embodiment, Digital Rights Management (DRM) is used with the encryption and/or security schemes described above.

As is known in the art, DRM is a group of technologies used for the secure distribution of electronic information that typically includes a set of rights or rules for the distribution, access, use and re-use of electronic information. DRM is typically used to protect digital content such as audio files (e.g., music, etc.) video files, electronic text or other types of electronic content in some pre-determined digital format. With DRM, electronic information transferred to/from a communications network 18 is protected so that it cannot be freely distributed and/or copied without proper authorization from the DRM method being used. DRM technologies typically include a set of rights, including, but not limited to, description rights, identification, rights, distribution rights, usage rights, tracking rights, etc.

In one embodiment, the electronic information, including the temporary information described below, includes DRM protection component. In one embodiment, the DRM component includes a software DRM component. In another embodiment, the DRM component includes hardware and/or firmware DRM component. In another embodiment, the DRM component includes a combination of software, hardware and/or firmware. In one embodiment, the hardware and/or firmware DRM component is included in a target device 12, 14, 16. In another embodiment the hardware and/or firmware DRM component is including in a server device 20, 22, 24. In other embodiments, the hardware and/or firmware DRM component is included in another device such as bridge, router, gateway, switch, access point etc.

Method for Receiving Temporary Information on a Personal Game Player

Figure 2:
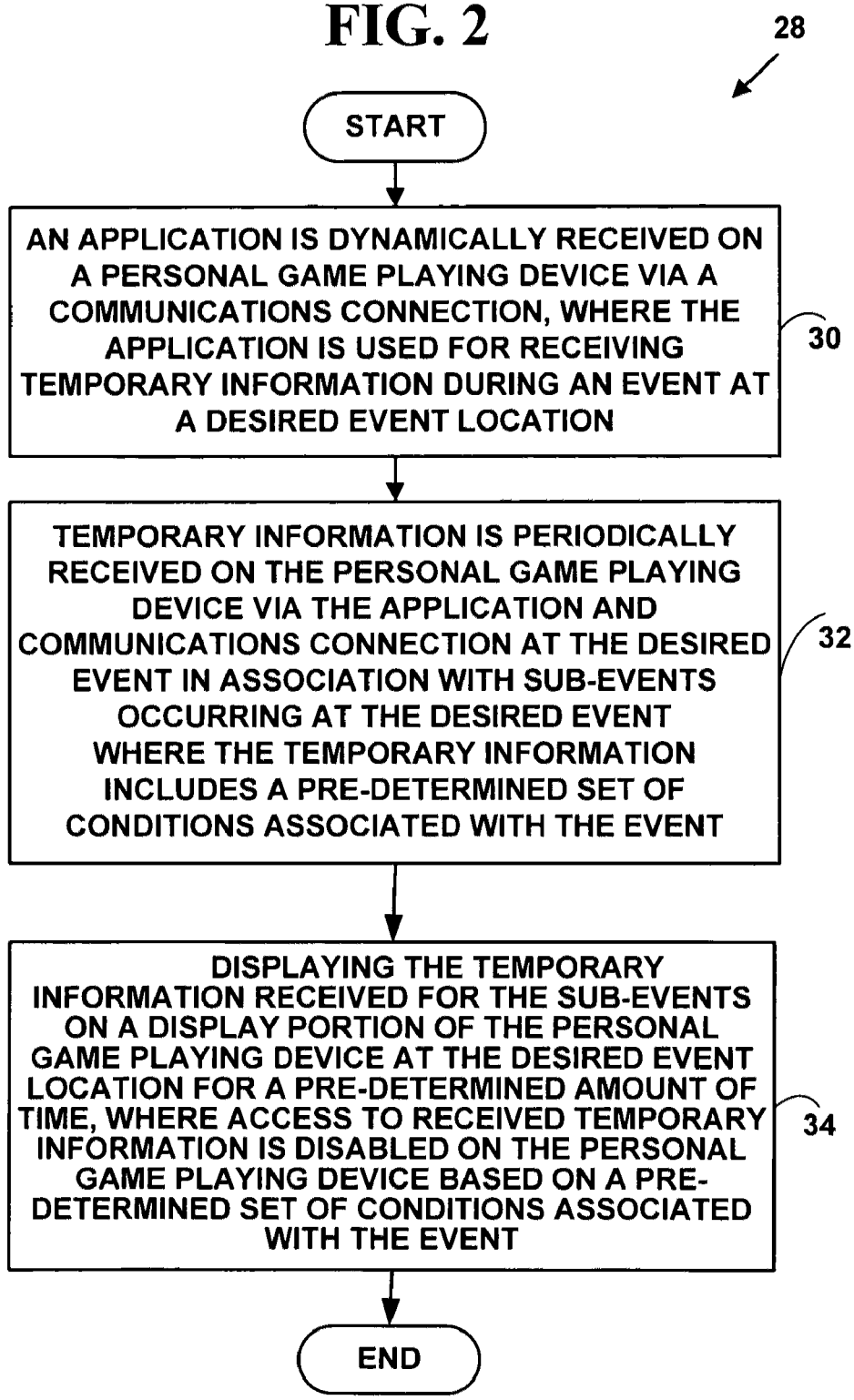
FIG. 2 is a flow diagram illustrating a method for receiving temporary information on a personal device.

FIG. 2 is a flow diagram illustrating a Method 28 for receiving temporary information on a personal game playing device. At Step 30, an application is dynamically received on a personal game playing device via a wireless connection. The application is used for receiving temporary information during an event at a desired event location. At Step 32, temporary information periodically is received on the personal game playing device via the application and the wireless connection at the desired event location in association with sub-events occurring during the event. The temporary information includes a set of pre-determined conditions for the event that allows access to the temporary information. At Step 34, the temporary information received for the sub-events is displayed on a display portion of the personal game playing device at the desired event location for a pre-determined amount of time. Access to received temporary information is disabled on the personal game playing device based on the pre-determined set of conditions associated with the event.

In one embodiment, Method 28 may further include Step 35 comprising sending a selection input via the application and the communications connection to purchase a good or service offered for sale in the received temporary information. In such an embodiment, a sub-event and/or event based opportunity is provided in the temporary information to allow a user of a personal game playing device to make an electronic purchase (e.g., credit card, debit card, electronic check, electronic funds transfers (e.g., Paypal, Google Market Place, etc.)) during the sub-event and/or event. For example, during a baseball game, fans may be offered an opportunity to purchase tickets for an upcoming game, team merchandise or other items during the game, or during inning during the game, etc. However, the present invention is not limited to this embodiment and can be practiced without using Step 35.

In another embodiment, Method 28 may further include Step 37 further comprising presenting the temporary information to a vendor during the event or temporal sub-event to purchase a good or service from the vendor. In such an embodiment, a sub-event and/or event based opportunity is provided in the temporary information to allow a user of a personal game playing device to make an in-person purchase during the sub-event and/or event. For example, during a baseball game, fans may be offered an opportunity to purchase tickets for an upcoming game, team merchandise or other items during the game, or during inning during the game, etc. from a vendor during the game, etc. However, the present invention is not limited to this embodiment and can be practiced without using Step 37.

In another embodiment, Method 28 may further include Steps 39 and 41. At Step 39, a selection input is sent from the personal game playing device via a communications connection to request additional information associated with the temporary information. At Step 41, the additional information is received via the communications connection on the personal game playing device. In such an embodiment, a user of a personal game playing device may desire additional in depth information. For example, during a baseball game, when the starting lineup is displayed, a user may desire to receive more in-depth information on their favorite player, etc. However, the present invention is not limited to this embodiment and can be practiced without using Steps 39 and 41.

Method 28 is illustrated with an exemplary embodiment. However, the present invention is not limited to this embodiment and other embodiments can also be used to practice the invention.

In such an exemplary embodiment at Step 30, an application 26 for receiving temporary information at a desired event is dynamically received on a personal game playing device 12, 14, 16 via a wireless connection from an application server (e.g., 20, etc.). The application 26 allows the personal game playing device 12, 14, 16 to receive information that is temporary in nature. For example, a user of the personal game playing device 12, 14, 16 may attend a sporting event, take a walk through a museum, listen to a political speech, attend a performance where performers are rated, eat dinner at a fast food restaurant, a fine food restaurant, etc.

In one embodiment, the user may receive the application 26 on the personal game playing device 12, 14, 16 at the event. The application 26 may be received via a wireless communication connection (e.g., via a wireless hotspot, etc.) In another embodiment, the application 26 may be received via a wired connection at the event (e.g. special counsels with wires, a port at an event seat, etc.) (See FIG. 3).

In another embodiment, the user may receive the application 26 on the personal game playing device 12, 14, 16 before attending an event. In such an embodiment, the application 26 may be received via a wireless or a wired connection (e.g., via the Internet, wireless hotspot, etc., a wired Internet connection, CATV, CD-ROM, floppy disk, etc.).

In one embodiment the application 26 includes a temporary software application 26 that communicates with a proprietary communications network 18 at the desired event location. In another embodiment, the application 26 includes a temporary software application that communicates via a public communications network 18 (PSTN, CATV, Internet, etc.) at the desired event location.

In one embodiment, at Step 30, the application 26 is received on the personal game playing device 12, 14, 16 via a client/server communications network. In another embodiment, at Step 30, the application 26 is received on a first personal game playing device (e.g., 12) via a P2P network from another personal game playing device (e.g., 16).

At Step 32, temporary information is periodically received on the personal game playing device 12, 14, 16, via the application at the desired event in association with sub-events occurring at the desired event. In one embodiment, the sub-events are time-based and are "temporal" based sub-events.

In one embodiment, the disabling mechanism includes DRM awareness, an encryption/decryption awareness mechanism, location awareness, temporal awareness, event awareness and/or sub-event awareness mechanisms.

In one embodiment, the temporary information is received in an encrypted formatted and is automatically decrypted by the application 26 upon completion of a desired event and/or sub-event. In another embodiment, the temporary information is received in an encrypted format and is manually decrypted when a user receives and enters a decryption key and/or code from the event (e.g., posting a decryption code on a scoreboard, posting a decrypting key at an exhibit in a museum, etc.).

In another embodiment, the temporary information is sent and received via a secure communications connection to/from the application 26. In one embodiment, the temporary information includes a DRM component.

In one embodiment, the temporary information includes a disabling mechanism that allows access to the temporary information to be disabled when one or more of conditions from the pre-determined set of conditions are met.

In one embodiment, disabling the temporary information includes deleting and/or encrypting, applying DRM etc. to the temporary information.

In one embodiment the location awareness includes Global Position Satellite (GPS) awareness. In another embodiment, the location awareness includes wireless and/or wired location awareness based on a hardware address (e.g., Medium Access Control (MAC), etc.) and/or a software address (e.g., IP, etc.), telecommunications device awareness (e.g., those techniques used to locate mobile phones, etc.) When the personal game playing device is moved a pre-determined distance away from the desired event location a change in GPS awareness or wireless and/or wired awareness will be detected and the temporary information will be disabled. However, the present invention is not limited to the location awareness described and other types of location awareness can be used to practice the invention.

In one embodiment, the pre-determined set of conditions includes a temporal awareness comprising a pre-determined amount of elapsed time from the event or a selected temporal sub-event.

A temporal sub-event is an event associated with a pre-determined time period. For example, if the event is a baseball game example, the application 26 is used to periodically receive temporary information about the game including starting line-ups, player's statistics, etc. at the beginning of the game, advertising for a sponsored advertiser during another inning, an electronic coupon for food, beverages, team products, etc., during yet another inning, contest information during yet another inning, an electronic coupon for a free soft drink if a player hits grand slam home run, etc. The application 26 is also used to periodically receive advertising information, contest information, etc. All of these sub-events occur at a pre-determine time period during the event.

In one embodiment, the information received is temporary in nature since most personal game playing device 12, 14, 16 do not have the ability to store such received information after the device is turned off (e.g., does not include any non-volatile storage).

In another embodiment, the information received is temporary because the information includes a disabling mechanism used by the application 26 that renders the information unreadable after a pre-determined condition is met. For example, the temporary information is automatically deleted, encrypted, etc. when a change in location awareness, temporal awareness, event awareness and/or sub-event awareness is detected.

In another embodiment, the information received is temporary because new information periodically received overwrites information received and stored earlier by the personal game playing device 12, 14, 16. In such an embodiment, a limited amount of storage space is available on the personal game playing device 12, 14, 16 and the application 26 continuously overwrites previously received information as it is viewed.

At Step 34, the temporary information received for the sub-events is displayed on a display portion of the personal game playing device 12, 14, 16 at the desired event location for a pre-determined amount of time. Access to received temporary information is disabled on the personal game playing device 12, 14, 16 based on the pre-determined set of conditions associated with the event. In one embodiment, the sub-events are temporal sub-events.

Continuing the baseball game example, a first temporal sub-event may include scores of other baseball games as they are completed. Another temporal sub-event may include multi-media information to cheer on the home team during a rally. Another temporal sub-event may include information from a sponsored advertiser displayed during a pre-determined inning. Another temporal sub-event may include the words to the song that is sung during the seventh inning stretch, etc. Another temporal sub-event may include an electronic coupon for a food and/or beverages during a selected inning or if a player hits for the cycle (i.e., a single, double, triple, home run) during the game, etc.

Figure 3:
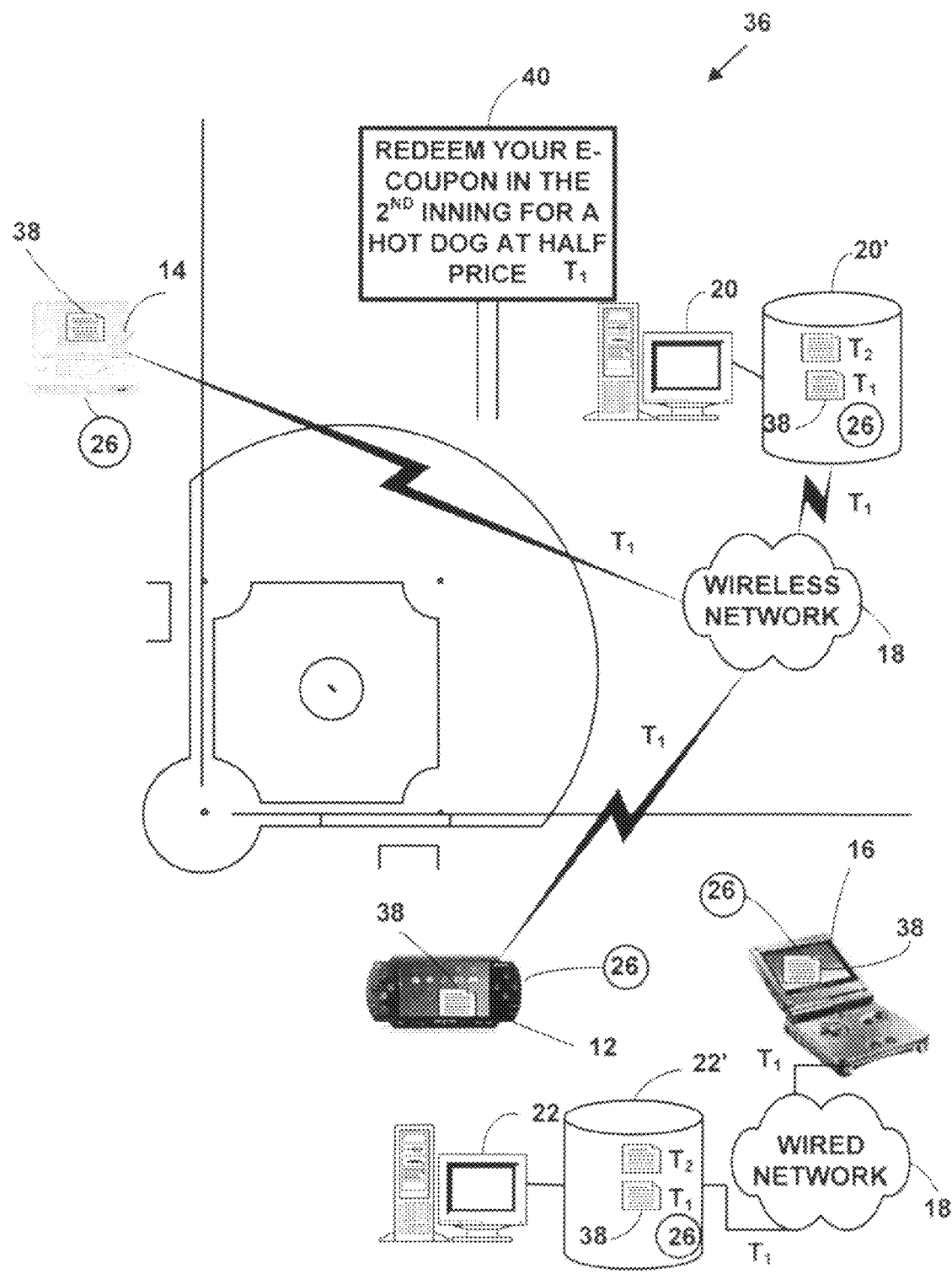
FIG. 3 is a block diagram 36 illustrating a data flow for the method of FIG. 2.

FIG. 3 is a block diagram 36 illustrating a data flow for Method 28. A first and second personal game playing device 12, 14 practice the method using a wireless communications connection to a wireless server 20 via communications network 18 and obtaining application 26 and an electronic coupon 38 for a half-price hot dog redeemable in the second inning of the baseball game in the received temporary information at Time $T_1$. An electronic reminder may also be displayed (e.g., on scoreboard 40) at the baseball game. Predetermined (e.g., coupons for the second inning, etc.) and dynamically generated temporary information (e.g., player hits a grand slam home run, etc.) are dynamically sent via a wireless connection to the first and second personal game playing devices 12, 14.

In this example, a third personal game playing device 16 uses a wired connection to a wired server 22 to obtain application 26 and electronic coupon 38.

In one embodiment the wired server 22 is accessed at the event either with a wired connection directly at a user's seat or via a wired connection in a central place at the event (e.g., multiple port wired connection location at the event, port wired connection at an event seat, etc.)

In such an embodiment, the user of the personal game playing device may not receive temporary electronic information that may be dynamically generated during the baseball game, (e.g., a player hitting a grand slam during the game, etc.). However, the user may re-visit a wired connection point at the game to obtain the dynamically generated during the game.

In another embodiment, wired server 22 is accessed before the user of personal game playing device 16 leaves for the event (e.g., via the Internet, etc.). In such an embodiment, the temporary electronic information is downloaded to the personal game playing device 16 in a disabled format (e.g., encrypted, time-stamped, decryption key/code stamped, etc.) and is enabled during the appropriate sub-event. In such an embodiment, the user of the personal game playing device 16 also does not receive temporary electronic information that may be dynamically generated during the baseball game, (e.g., a player hitting a grand slam during the game, etc.). However, the user may re-visit a wired connection point at the game to obtain the dynamically generated during the game. In such an embodiment the user of the personal game playing device may also have to set, re-set or sync a clock on the personal game playing device to match a clock at the event to ensure that temporary information associated with sub-events and/or temporal sub-events arrive at the appropriate time at the event.

Method 28 has been illustrated with the example of a live sporting event including a baseball game. However, the present invention is not limited to such an embodiment and can be practice at any event, live or not-live with temporal sub-events (e.g., plays, operas, movies, speeches, lectures, political events, museums, religious services, restaurants, etc.). The event need not include a live performance. For example, the temporal sub-events at a museum include walking from first exhibit to other exhibits, etc. at which a decryption key and/or code, location or other disabling mechanism is used. Temporal sub-events at movie include receiving additional advertiser information during a movie when an advertiser's information is displayed in the movie as a temporal sub-event, sending an electronic coupon for popcorn during the advertising displayed before the movie, etc. The event also includes training information for a business or a university. A university professor provides lecture notes to be obtained on the personal game playing device 12, 14, 16. A business organization provides training information to train new or existing employee's on the personal game playing device 12, 14, 16.

In one embodiment, if the networking applications 26 are used with Method 28, communications between the personal game playing device 12, 14, 16 and the server devices 20, 22, 24 are secure wired and/or wireless communications (e.g., encrypted, HTTPS, SSL, TLS, CCX, etc.) over the communications network 18. In another embodiment, the communications are non-secure.

Method for Interacting with Temporary Information Received on a Personal Game Playing Device FIG. 4 is a flow diagram illustrating a Method 42 for interacting with temporary information received on a personal game playing device. At Step 44, temporary information is periodically received on a personal game playing device via an application via a communications connection via a communications network at an event in association with temporal sub-events occurring at the event. At Step 46, a list of plural selections is displayed on the personal game playing device in association with the received temporary information. At Step 48, a selection input to select one of the plural selections from the list in association with the received temporary information is sent via the communications connection, wherein the selection input allows an action to be processed on a server on the communications network for the event.

Method 42 is illustrated with an exemplary embodiment. However, the present invention is not limited to this embodiment and other embodiments can also be used to practice the invention.

In such an exemplary embodiment at Step 44, temporary information is periodically received on a personal game playing device 12, 14, 16 via an application 26 via a communications connection via a communications network 18 at an event in association with temporal and/or non-temporal sub-events occurring at the event.

In one embodiment, the communications network 18 includes a client/server network. In another embodiment, the communications network includes a P2P network.

At Step 46, a list of plural selections is displayed on the personal game playing device 12, 14, 16 in association with the received temporary information. For example, the list of plural selection may be a list of players to vote for, a list of contestants to select a winner from, a prediction for a sporting event (e.g., fantasy sport predictions, a prediction in which inning a baseball player will hit the first home run, final score, etc.), a list of opinions for a survey in a restaurant, list of goods and/or services available for sale, a list of electronic coupons for the event and/or sub-events, etc.

At Step 48, a selection input to select one of the plural selections from the list in association with the received temporary information is sent via the communications connection, wherein the selection input allows an action to be processed on a server 20, 22, 24 on the communications network 18.

The selection input is used to process a specific response (e.g., record a survey, contest, accept a sale, accept a coupon, redemption, etc.). In another embodiment, the selection input is used to generate a request for further information for the user of the personal game playing device (e.g., request more information on an advertiser, request ticket information for another event, etc.). In another embodiment, the selection input is used to electronically purchase (e.g., via the personal game playing device via a credit card, debit card, electronic check, etc.) an item during a sub-event and/or event. In another embodiment, the selection input is used to purchase an item during a sub-event and/or event. (e.g., at a vendor's booth by displaying the received temporary information to the vendor, etc.).

Method for Processing Temporary Information for a Personal Game Playing Device

FIG. 5 is a flow diagram illustrating a Method 50 for processing temporary information for personal game playing device. At Step 52, an application is dynamically broadcast to plural personal game playing devices via a communications network from a network device. The application is used for receiving temporary information during an event at a desired event location. At Step 54, temporary information is periodically sent to the plural personal game playing devices via the communications network at the desired event location in association with sub-events occurring during the event. The temporary information includes a pre-determined set of conditions associated with the event. At Step 56, plural selection inputs are received from plural personal game playing devices via the communications network to request additional information associated with the sent temporary information.

Method 50 is illustrated with an exemplary embodiment. However, the present invention is not limited to this embodiment and other embodiments can also be used to practice the invention.

In such an exemplary embodiment at Step 52, an application 26 is dynamically broadcast to plural personal game playing devices 12, 14, 16 via a communications network 18 from a network device. In one embodiment, the network device is a server network device 20, 22, 24. In another embodiment, the network device is a personal game playing device. The application 26 is used for receiving temporary information during an event at a desired event location. In one embodiment, the application is broadcast several hours before an event at a desired event location and terminated when the event ends and/or when a desired sub-event at the event is reached.

In one embodiment, at Step 52, the application 26 is broadcast to the personal game playing device 12, 14, 16 via a client/server communications network 18 from a server device 20, 22, 24. In another embodiment, at Step 52, the application 26 is broadcast to a first personal game playing device (e.g., 12) via a P2P network 18' from another personal game playing device (e.g., 16) and no network servers are used. In another at Step 52 the application 26 is broadcast to the personal game playing devices 12, 14, 16 via a P2P communications network via personal game playing devices 12, 14, 16 to/from server devices 20, 22, 24.

At Step 54, temporary information is periodically sent to the plural personal game playing devices 12, 14, 16 from event servers 20, 22, 24 via the communications network 18 at the desired event location in association with sub-events occurring during the event. The temporary information includes a pre-determined set of conditions associated with the event as was described above.

At Step 56, plural selection inputs are received from plural personal game playing devices 12, 14, 16, on the event server 20, 22, 24 via the communications network 18 to request additional information associated with the sent temporary information as was described above.

The methods and system described herein may help further utilize large base of personal game playing device by allowing them to receive temporary information associated with temporal sub-events for a desired event.

It should be understood that the programs, processes, methods and system described herein are not related or limited to any particular type of computer or network system (hardware or software), unless indicated otherwise. Various combinations of general purpose, specialized or equivalent computer components including hardware, software, and firmware and combinations thereof may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more fewer or equivalent elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended.

Therefore, all embodiments that come within the scope and spirit of the following claims and equivalents thereto are claimed as the invention.

I claim:

1. A method for receiving temporary information on a personal game playing device, comprising:

receiving dynamically a temporary application on a personal game playing device with one or more processors from a network device with one or more processors via a communications connection to a communications network, wherein the temporary application is used only for receiving temporary information during an event at a desired event location;

receiving periodically temporary information with a disabling mechanism on the temporary application on the personal game playing device from the network device and the communications connection at the desired event location in association with sub-events occurring during the event, wherein the received temporary information includes a pre-determined set of conditions associated with the event, wherein the disabling mechanism allows access to the received temporary information on the personal game playing device to be disabled when one or more of conditions from the pre-determined set of conditions are met and wherein the disabling mechanism includes an encryption/decryption mechanism, location awareness, temporal awareness, event awareness and sub-event awareness mechanisms;

displaying the received temporary information on the temporary application for the sub-events on a display portion of the personal game playing device at the desired event location for a pre-determined amount of time;

continuously overwriting with the temporary application received temporary information as it is viewed on the display portion of the personal game playing device thereby making the received temporary information unavailable;

receiving periodically new temporary information on the temporary application on the personal game playing device from the network device and the communications connection in association with new sub-events occurring during the event;

overwriting on the temporary application on the personal game playing device previously received temporary information with the new temporary information, thereby making the previously received temporary information unavailable; and disabling automatically on the temporary application access to the temporary information with the disabling mechanism from the temporary information when one or more of conditions from the pre-determined set of conditions are met, wherein disabling access to the temporary information includes encrypting the temporary information on the personal game playing device or deleting the temporary information from the personal game playing device with the temporary application.

2. The method of claim 1 wherein the communication connection includes a wireless or a wired communications connection.

3. The method of claim 1 wherein the temporary application includes a temporary software application that communicates with a proprietary communications network at the desired event location.

4. The method of claim 1 wherein the temporary application includes a temporary software application that communicates via a public communications network at the desired event location.

5. The method of claim 1 wherein the step of receiving a temporary application includes securely receiving the temporary application via a secure communications connection.

6. The method of claim 1 wherein the pre-determined set of conditions include a pre-determined amount of elapsed time from the event or a selected temporal sub-event, or moving the personal game playing device a pre-determined distance away from the desired event location.

7. The method of claim 1 wherein the temporary information includes a Digital Rights Management (DRM) component.

8. The method of claim 1 further comprising:
sending a selection input from temporary application on the personal game playing device via the communications connection to request additional information associated with the temporary information; and
receiving the additional information on the temporary application via the communications connection on the personal game playing device.

9. The method of claim 1 further comprising:
sending another selection input via the temporary application on the personal game playing device and the communications connection to electronically purchase a good or service offered for sale in the received temporary information during the event or temporal sub-event.

10. The method of claim 1 further comprising:
presenting the temporary information to a vendor during the event or temporal sub-event to purchase a good or service from the vendor.

11. The method of claim 1 further comprising:
periodically receiving new temporary information with the disabling mechanism on the personal game playing device via the temporary application from the network device via the communication connection via the communications network at an event in association with temporal sub-events occurring at the event;
displaying a list of a plurality of selections on the personal game playing device associated with the received new temporary information; and
sending a new selection input from the temporary application on the personal game playing device to select one of the plurality of selections from the list in association with the received new temporary information, wherein the new selection input allows an action to be processed on a server network device with one or more processors on the communications network.

12. The method of claim 11 further comprising:
presenting the new temporary information to a vendor during the event or temporal sub-event to purchase a good or service from the vendor.

13. The method of claim 11 wherein the list of plurality of selections includes a list of candidates to vote for, a list of contestants to select a winner from, a prediction for a sporting event, a list of opinions for a survey in a restaurant, list of goods or services available for sale, or a list of electronic coupons for the event or sub-events.

14. The method of claim 1 further comprising:
broadcasting dynamically the temporary application to a plurality of other personal game playing devices each with one more processors via the communications network from the network device wherein the temporary application is used for receiving temporary information during the event at the desired event location;
sending periodically from the network device temporary information with the disabling mechanism to the plurality of personal game playing devices via the communications network at the desired event location in association with sub-events occurring during the event, wherein the temporary information includes a pre-determined set of conditions associated with the event; and
receiving a plurality of selection inputs on the network device from a plurality of personal game playing devices via the communications network to request additional information associated with the sent temporary information.

15. The method of claim 14 wherein the plurality of selection inputs include a plurality of selection inputs to record a survey, enter a contest, accept a sale of goods or services, accept a coupon, or redeem a coupon.

16. The method of claim 14 wherein the communications network is a wireless communication network.

17. The method of claim 14 wherein the communications network includes a client/server network or a peer-to-peer network.

18. The method of claim 14 wherein the network device includes a server network device or another personal game playing device each with one or more processors.

19. A non-transitory computer readable medium have stored therein a plurality of instructions for causing one or more processors to execute the steps of:
receiving dynamically a temporary application on a personal game playing device with one or more processors from a network device with one or more processors via a communications connection to a communications network, wherein the temporary application is used only for receiving temporary information during an event at a desired event location;
receiving periodically temporary information with a disabling mechanism on the temporary application on the personal game playing device from the network device and the communications connection at the desired event location in association with sub-events occurring during the event,
wherein the received temporary information includes a pre-determined set of conditions associated with the event, wherein the disabling mechanism allows access to the received temporary information on the personal game playing device to be disabled when one or more of conditions from the pre-determined set of conditions are met and wherein the disabling mechanism includes an encryption/decryption mechanism, location awareness, temporal awareness, event awareness and sub-event awareness mechanisms;
displaying the received temporary information on the temporary application for the sub-events on a display portion of the personal game playing device at the desired event location for a pre-determined amount of time;
continuously overwriting with the temporary application received temporary information as it is viewed on the display portion of the personal game playing device thereby making the received temporary information unavailable;

receiving periodically new temporary information on the temporary application on the personal game playing device from the network device and the communications connection in association with new sub-events occurring during the event;

overwriting on the temporary application on the personal game playing device previously received temporary information with the new temporary information, thereby making the previously received temporary information unavailable; and disabling automatically on the temporary application access to the temporary information with the disabling mechanism from the temporary information when one or more of conditions from the pre-determined set of conditions are met, wherein disabling access to the temporary information includes encrypting the temporary information on the personal game playing device or deleting the temporary information from the personal game playing device with the temporary application.

20. A system for sending and receiving temporary information to and from a personal game playing device, comprising in combination:

for receiving dynamically a temporary application on a personal game playing device with one or more processors from a network device with one or more processors via a communications connection to a communications network, wherein the temporary application is used only for receiving temporary information during an event at a desired event location;

for receiving periodically temporary information with a disabling mechanism on the temporary application on the personal game playing device from the network device and the communications connection at the desired event location in association with sub-events occurring during the event, wherein the received temporary information includes a pre-determined set of conditions associated with the event, wherein the disabling mechanism allows access to the received temporary information on the personal game playing device to be disabled when one or more of conditions from the pre-determined set of conditions are met and wherein the disabling mechanism includes an encryption/decryption mechanism, location awareness, temporal awareness, event awareness and sub-event awareness mechanisms;

for displaying the received temporary information on the temporary application for the sub-events on a display portion of the personal game playing device at the desired event location for a pre-determined amount of time;

for continuously overwriting with the temporary application received temporary information as it is viewed on the display portion of the personal game playing device thereby making the received temporary information unavailable;

for receiving periodically new temporary information on the temporary application on the personal game playing device from the network device and the communications connection in association with new sub-events occurring during the event;

for overwriting on the temporary application on the personal game playing device previously received temporary information with the new temporary information, thereby making the previously received temporary information unavailable; and for disabling automatically on the temporary application access to the temporary information with the disabling mechanism from the temporary information when one or more of conditions from the pre-determined set of conditions are met, wherein disabling access to the temporary information includes encrypting the temporary information on the personal game playing device or deleting the temporary information from the personal game playing device with the temporary application.

* * * * *